US007117333B2

(12) United States Patent
Beeston et al.

(10) Patent No.: US 7,117,333 B2
(45) Date of Patent: Oct. 3, 2006

(54) APPARATUS, SYSTEM, AND METHOD TO ESTIMATE MEMORY FOR RECOVERING DATA

(75) Inventors: Ralph Thomas Beeston, Tucson, AZ (US); Kirby Grant Dahman, Tucson, AZ (US); Gavin Stuart Johnson, Aromas, CA (US); Trang Thuy Le, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 10/648,582

(22) Filed: Aug. 25, 2003

(65) Prior Publication Data
US 2005/0050382 A1 Mar. 3, 2005

(51) Int. Cl.
*G06F 12/00* (2006.01)
(52) U.S. Cl. ............................ 711/170; 711/171
(58) Field of Classification Search ................ 711/170, 711/171
See application file for complete search history.

(56) References Cited

U.S. PATENT DOCUMENTS

| | | | | |
|---|---|---|---|---|
| 4,445,176 A | | 4/1984 | Burk et al. ................ 364/200 |
| 5,568,635 A | * | 10/1996 | Yamaguchi ................ 711/171 |
| 5,594,889 A | | 1/1997 | Colgate et al. ......... 395/497.02 |
| 5,615,392 A | | 3/1997 | Harrison et al. ............ 395/876 |
| 5,712,976 A | | 1/1998 | Falcon, Jr. et al. ..... 395/200.09 |
| 5,784,698 A | | 7/1998 | Brady et al. ................ 711/171 |
| 5,802,351 A | | 9/1998 | Frampton .................... 395/500 |
| 5,920,732 A | * | 7/1999 | Riddle ......................... 710/56 |
| 6,046,817 A | * | 4/2000 | Brown et al. ............... 358/1.16 |
| 6,457,081 B1 | | 9/2002 | Gulick ......................... 710/129 |
| 6,553,438 B1 | | 4/2003 | Coffman et al. ............. 710/52 |
| 6,678,812 B1 | * | 1/2004 | Begis et al. ................ 711/171 |
| 2003/0061456 A1 | | 3/2003 | Ofek et al. ................. 711/162 |

FOREIGN PATENT DOCUMENTS

| | | |
|---|---|---|
| EP | 1217842 | 12/2001 |
| JP | 2000259525 | 9/2000 |
| JP | 2000322334 | 11/2000 |

OTHER PUBLICATIONS

Sheu et al., "A Buffer Allocation Mechanism for VBR Video Playback", Int. Conf. On Communication Technology Proceedings, Aug. 2000.
Zouta et al., "Dynamic Threshold Control in an ATM Switch with Shared Memory Buffer", Electronics and Communications in Japan, 2000.
Blades et al., "Pre-Allocation of Remote Storage on a Maximum Frame-Size Basis", IBM TDB, n6, Nov. 1991.

* cited by examiner

*Primary Examiner*—Jack A. Lane
(74) *Attorney, Agent, or Firm*—Kunzler & Associates

(57) ABSTRACT

The process, apparatus, and system estimate the size of a data block in a data buffer to efficiently recover the data block to the memory of a computer. The data block resides in a data buffer prior to being written to a destination medium. If the data block cannot be written to the destination medium, the process, apparatus, and system create a data block size estimate. The data block size estimate may be based on the size of the largest data block in the data buffer. Alternately, the data block size estimate may be based on the size of a data block in the memory of the computer. The computer reserves a memory space proportional to the data block size estimate and recovers the data block to the memory space.

28 Claims, 8 Drawing Sheets

APPARATUS, SYSTEM, AND METHOD TO ESTIMATE MEMORY FOR RECOVERING DATA

BACKGROUND OF THE INVENTION

1. Field of the Invention

This invention relates to estimating the size of a data block in a data buffer, and more particularly, relates to creating an estimate for allocating memory to recover the data block from the data buffer.

2. Description of the Related Art

Computer systems regularly write data blocks from their internal memory to a data buffer of an external destination node. Conventional destination nodes may include storage devices, network connections, and transmission devices. The data buffer stores the data block until the data block is written to the destination medium and the transaction is completed, Conventional destination mediums may include magnetic tape, a hard disk drive, an optical storage drive, or a router. The computer system considers the data block write transaction as complete when the data block is written to the data buffer. The memory locations where the data block was stored in the computer system, such as RAM, may be deallocated and overwritten.

If an error occurs that prevents the data block from being written to the destination medium after the location where the data block was stored in computer memory space has been deallocated, the data block will be lost unless the computer system recovers the data block from the data buffer. The computer system recovers the data block by allocating a memory space sufficient to hold the data block in the computer's memory, such as RAM memory. The computer then copies the data block from the data buffer into the memory space.

The computer system does not retain a record of the size of the data block after the data block has been written to the data buffer. Yet the computer system must reserve a memory space sufficiently large to contain the data block, or a portion of the data block may be lost. Computer systems frequently reserve a memory space as large as the entire data buffer to ensure that the memory space is sufficiently large to recover the whole data block.

Reserving a memory space as large as the data buffer, however, may consume significantly more memory than is required to actually recover the data block. Reserving excessive memory increases the processing time required to complete recovery of the data block, potentially putting the successful completion of the recovery at risk. Excessive reservation of memory for recovery operations may also slow down other computer functions that require memory. The degradation of computer performance due to excessive memory reservation may be exacerbated when multiple memory spaces must be allocated to recover multiple data blocks from the data buffer. Recovering multiple data blocks can even consume enough memory to completely stall computer operation.

FIG. 1 is a block diagram illustrating a conventional data processing system 100. The system 100 includes a computer 105, a destination node 110, a memory module 115, a processor module 120, a data buffer 125, and a destination medium 130. The system 100 transfers data blocks from the computer 105 to the destination node 110. The transfer is typically conducted using a bus or computer network 140.

The computer 105 transfers a data block to a destination node 110, copying car the data block from the memory module 115 to the data buffer 125 of the destination node 110. The destination node 110 copies the data block from the data buffer 125 to the destination medium 130 to complete the transfer.

FIG. 2 is block diagram illustrating a memory map 200 of the current technology. The memory map 200 includes a memory module 115, a data buffer 125, one or more memory data blocks 205, one or more buffer data blocks 210, and an allocated memory space 215. The memory map 200 shows the disposition of data blocks in the memory module 115 and the data buffer 125 during a data recovery process.

The computer 105 transfers a memory data block 205c to the destination node 110 by copying the memory data block 205c to the buffer data block 210a in the data buffer 125 as indicated by an arrow 220. Buffer data blocks 210 typically occupy less than the whole data buffer 125. The destination node 110 writes the buffer data block 210a to the destination medium 130 to complete the transfer. If an error condition occurs before the buffer data block 210a can be completely written to the destination medium 130, the computer 105 initiates a data block recovery process to recover the buffer data block 210a.

The computer 105 reserves the allocated memory space 215 to recover the buffer data block 210a. The allocated memory space 215 must be as large as the buffer data block 210a or a portion of the buffer data block 210a will be lost. The size of the allocated memory space 215 that is typically reserved is equal to the size of the data buffer 125 to assure that no data in the buffer data block 210a is lost. The computer 105 copies the buffer data block 210a to the allocated memory space 215 as indicated by an arrow 225 to complete the data block recovery process.

As can be seen from FIG. 2, the allocated memory space 215 is frequently much larger than is needed to recover the buffer data block 210a. Reserving more memory than is needed is costly. The unused portion of the allocated memory space 215 cannot be used for other computer 105 processes. Reserving a large memory space also takes more processing time than reserving a smaller space. Reserving memory for recovering buffer data blocks 210 will occasionally consume more memory space than is available in the memory module 115, causing the computer 105 to stall.

The reserving of memory space 215 for recovering buffer data blocks 210 and the memory related performance of the computer 105 may be improved if the size of the allocated memory space 215 more closely approximates the size of the recovered buffer data block 210. The computer 105 can more efficiently reserve a smaller memory space equivalent to the size of the buffer data block 210 instead of a larger allocated memory space 215 equal to the size of the data buffer. Reserving memory space equal to the buffer data block 210 size would also reduce the total memory required by the data block recovery procedure, freeing memory from other tasks.

Accordingly a need exists for what is needed is a process, apparatus, and system that estimate the size of a data block to be recovered during an error condition. Beneficially, such a process, apparatus, and system would accelerate the allocation of memory for recovering data blocks and reduce the consumption of memory by the data block recovery procedure.

BRIEF SUMMARY OF THE INVENTION

The present invention has been developed in response to the present state of the art, and in particular, in response to the problems and needs in the art that have not yet been fully solved by currently available data block recovery processes.

Accordingly, the present invention has been developed to provide a process, apparatus, and system for estimating the size of a data block that overcome many or all of the above-discussed shortcomings in the art.

The apparatus for estimating data block size is provided with a block estimator containing a plurality of modules configured to functionally execute the necessary steps of estimating the data block size for a data block that is to be recovered from a data buffer. These modules in the described embodiments include a communications module, a register module, and a logic module.

The communications module communicates with the data buffer and a computer. The logic module queries the data buffer and the computer through the communications module. In one embodiment, the logic module queries the size of a buffer data block in the data buffer. In an alternate embodiment, the logic module queries the size of a memory data block in the computer.

The register module stores a data block size record. The logic module sets the value of the data block size record to the greater of the current data block size record and the size of the queried data block. The logic module further generates a data block size estimate proportional to the data block size record. In one embodiment, the data block size estimate is equal to the data block size record. In an alternate embodiment, the data block size estimate is greater than the data block size record. The block estimator may communicate the data block size estimate to a computer.

A system of the present invention is also presented for estimating data block size for allocating memory to recover a data block. The system may be embodied in a data processing system. In particular, the system, in one embodiment, includes a data buffer for storing a data block, a memory module for storing one or more data blocks, and a block estimator module that estimates the size of the data block.

The system copies a memory data block to the data buffer as a buffer data block. In one embodiment, the buffer data block is stored in the data buffer prior to being written to the destination medium. The destination medium may be a storage device such as a tape drive. The system deallocates the memory space of the memory data block after copying the data block to the data buffer. The buffer data block may also be deleted from the data buffer after the data block is written to destination node.

If an error condition occurs that prevents the buffer data block from being written to the destination node, the system may attempt to recover the data block to the memory module. To recover a data block from the data buffer, the block estimator module estimates the size of the buffer data block. The system reserves an allocated memory space in the memory module proportional to the data block size estimate. The data block is copied to the allocated memory space to complete the data block recovery.

In one embodiment, the block estimator module estimates the data block size estimate as proportional to the largest buffer data block in the data buffer. In an alternate embodiment, the data block size estimate is proportional to the largest memory data block in the memory module. In a certain embodiment, the data block size estimate is proportional to the size of a memory data block queued to be written to the data buffer. The data block size estimate may be smaller, equal to, or larger than the data block size used to create the data block size estimate.

A process of the present invention is also presented for estimating the size of a data block for recovering the data block. The process in the disclosed embodiments substantially includes the steps necessary to carry out the functions presented above with respect to the operation of the described apparatus and system. In one embodiment, the process includes querying the size of a data block and creating a data block size estimate proportional to the size of the queried data block.

In one embodiment, the queried data block is the largest data block in a data buffer. The largest block may be the largest block written since the data buffer was emptied or the largest data block in the data buffer. In an alternate embodiment, the queried data block is a data block in a memory module of a computer. In a certain embodiment, the data block size estimate is equal to the size of a data block queued to be written to the data buffer. In one embodiment, the process creates a data block size estimate equal to the size of the queried data block. In an alternate embodiment, the process creates a data block size estimate greater than the size of the queried data block. In one embodiment, the process records the size of the largest data block in the data buffer.

The present invention estimates the size of a data block in a data buffer. The data block size estimate may be used to reserve memory space for recovering the buffer data block from the data buffer. The data block size estimate is typically smaller than an estimate based on the size of the data buffer, reducing the processing time and memory required to reserve a sufficiently large memory space to recover the buffer data block. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
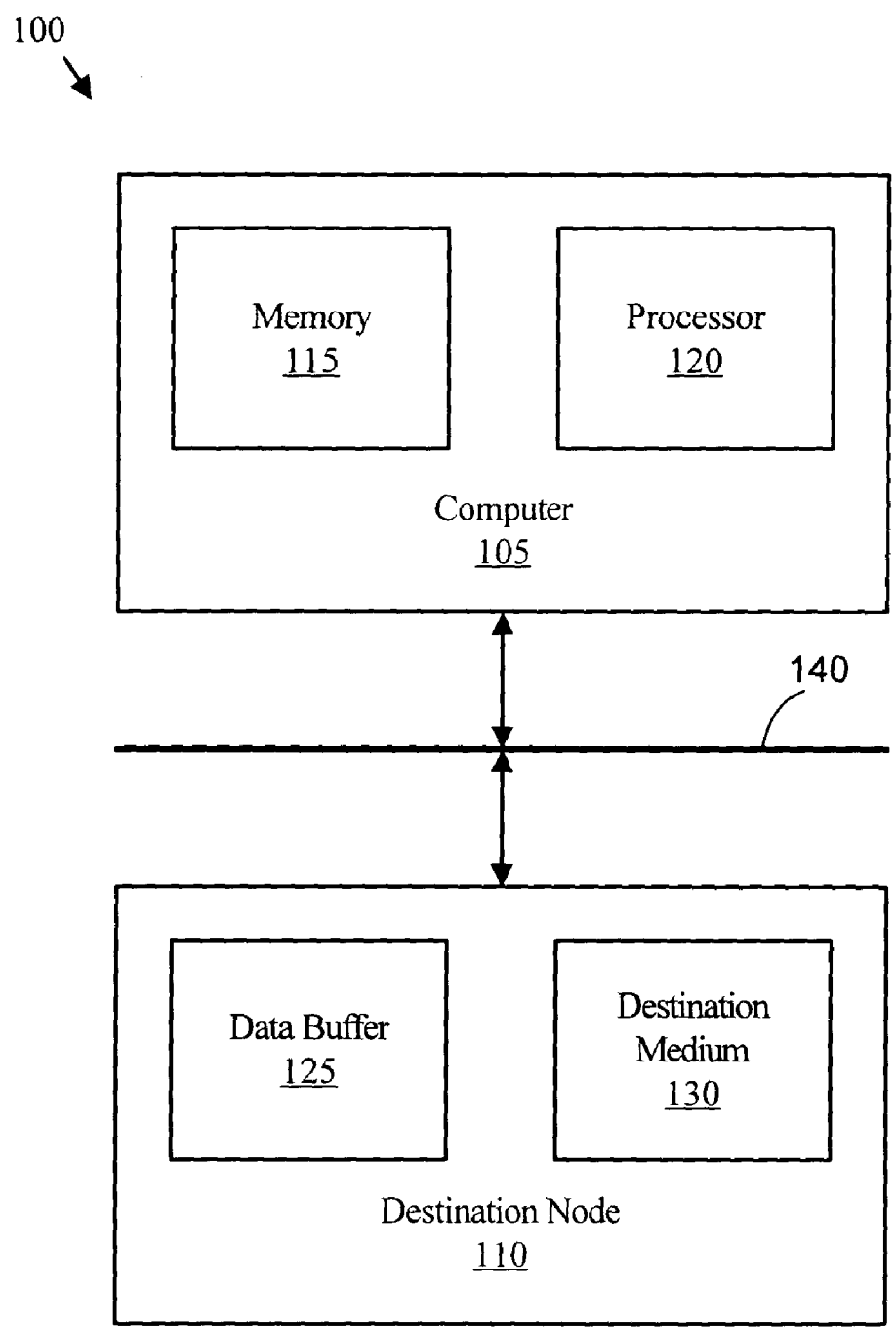
FIG. 1 is a block diagram illustrating a data processing system of the current technology.
Figure 2:
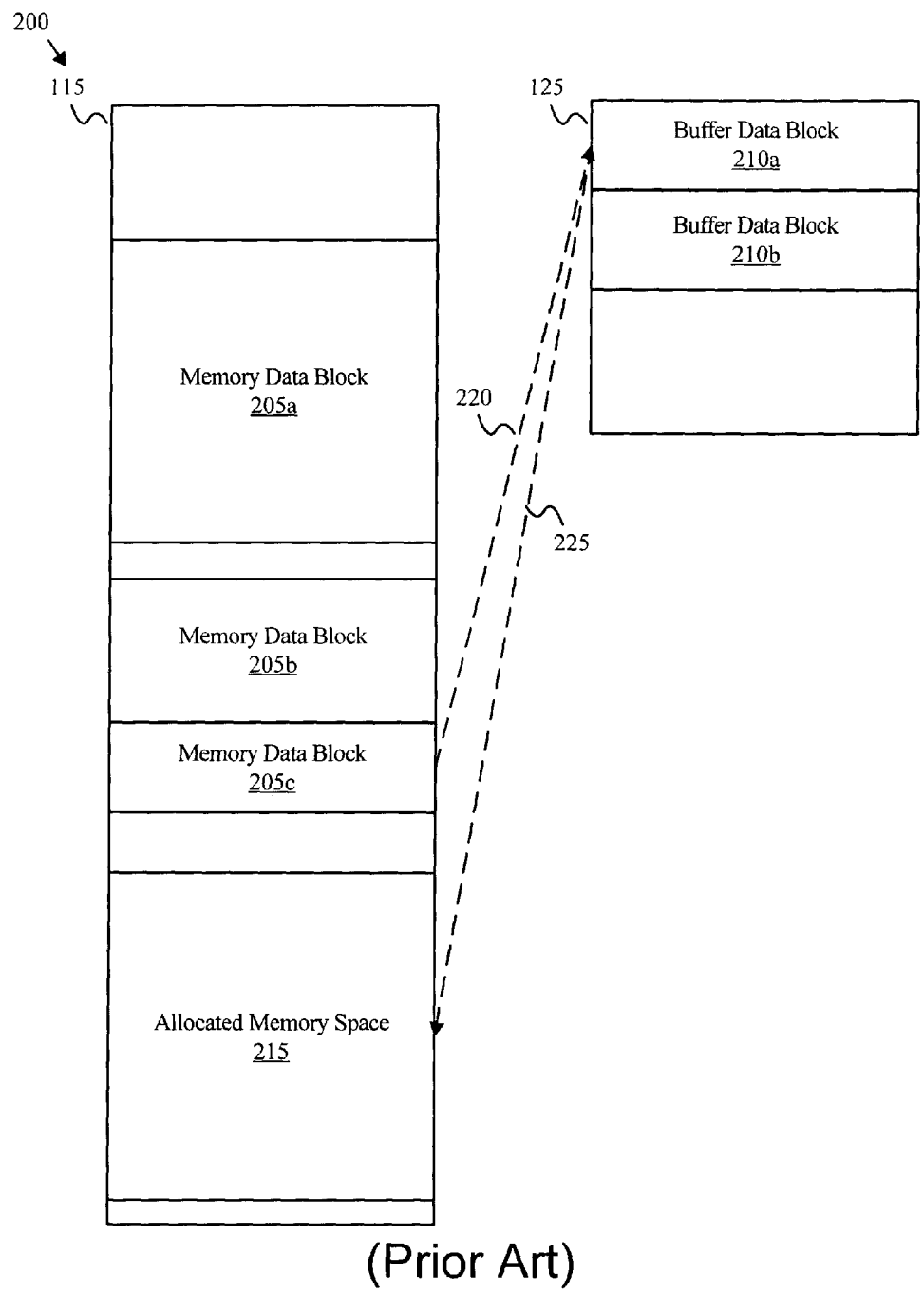
FIG. 2 is block diagram illustrating a memory map of the current technology.
Figure 3:
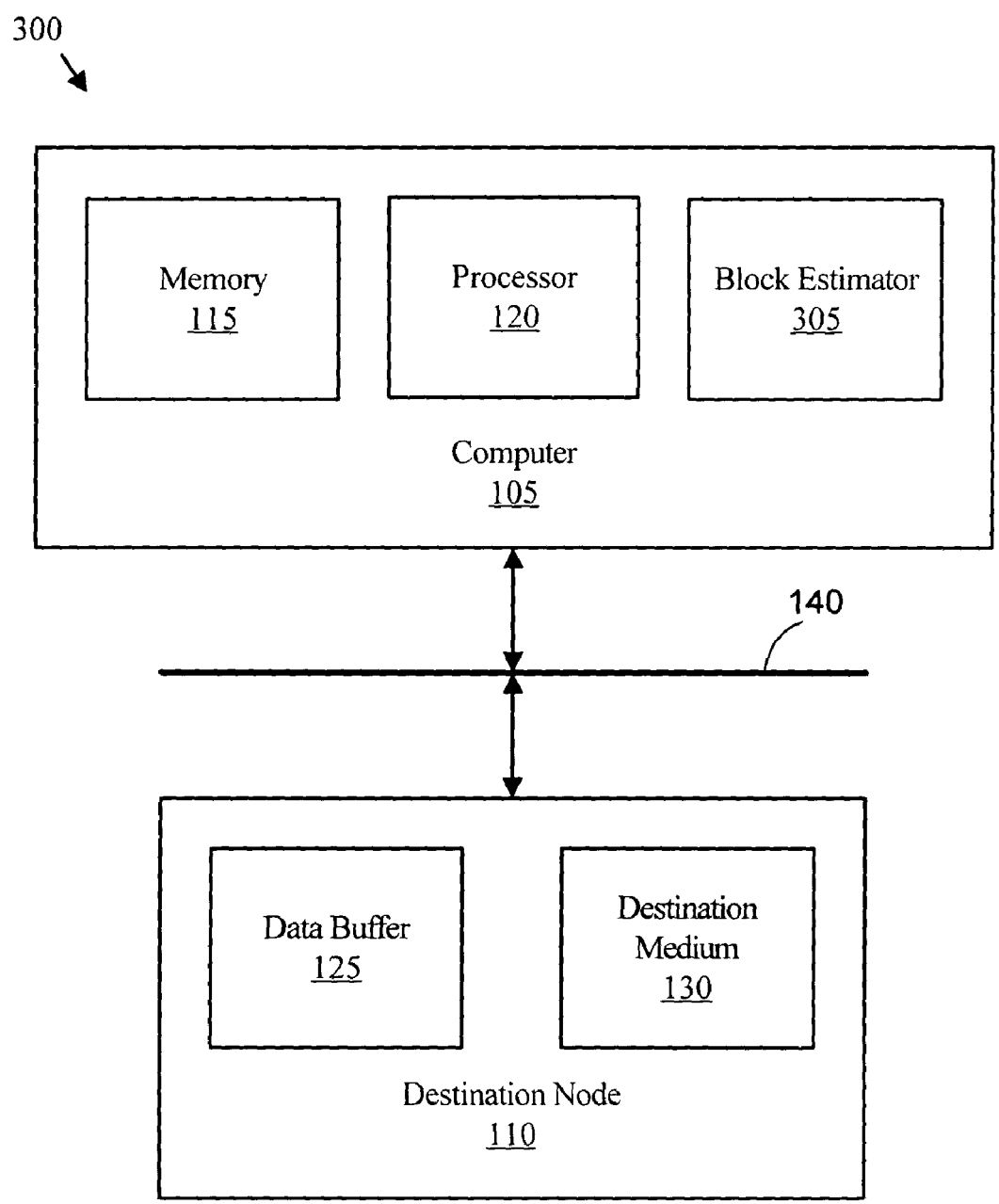
FIG. 3 is a block diagram illustrating one embodiment of a data processing system of the present invention.

FIG. 3 is a block diagram illustrating one embodiment of a data processing system 300 of the present invention. The system 300 includes a computer 105, a memory module 115, a processor module 120, a block estimator module 305, a destination node 110, a data buffer 125, a destination medium 130 and a bus or computer network 140. The data processing system 300 illustrates the recovery of a data block transferred to the destination node 110.

If an error occurs before the buffer data block 210a is written to the destination medium 130, the computer 105 recovers the buffer data block 210a. To recover the buffer data block 210a, the block estimator module 305, in one embodiment, estimates the size of the buffer data block 210a. The block estimator module 305 reserves an allocated memory space in memory module 115 proportional to the data block size estimate. The computer 105 copies the buffer data block 210a to the allocated memory space to complete the data block recovery process.

In one embodiment, the block estimator module 305 determines the size of the largest buffer data block 210b in the data buffer 125 and creates the data block size estimate proportional to the largest buffer data block size. In an alternate embodiment, the block estimator module 305 creates the data block size estimate proportional to the size of the largest memory data block 205a in the memory module 115. In a certain embodiment, the block estimator module 305 creates the block estimator module 305 proportional to the size of the memory data block 205 created by the same application software that created the buffer data block 210a. In another embodiment, the data block size estimate is equal to the size of the largest data block. In yet another embodiment, the data block size estimate is larger than the size of the largest data block.

The data processing system 300 recovers a buffer data block 210 from the data buffer 125 of the destination node 110 if an error prevents the completion of a data write transaction to the destination medium 130. The block estimator 305 creates a data block size estimate that is typically smaller than the size of the data buffer 125. The system 300 reserves the allocated memory space to recover the buffer data block 210a proportional to smaller data block size estimate, reducing the memory space requirements of a data block recovery process.

Figure 4:
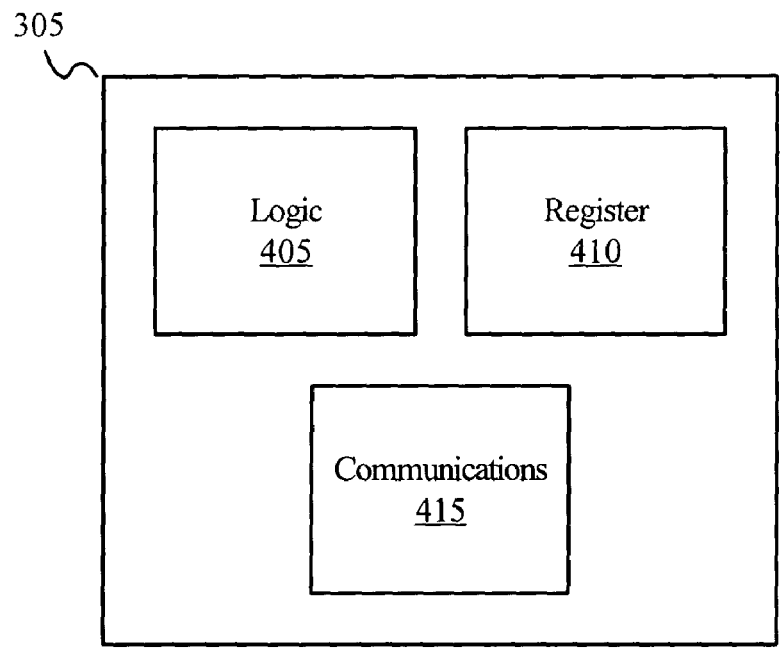
FIG. 4 is a block diagram illustrating one embodiment of a block estimator of the present invention.

FIG. 4 is a block diagram illustrating one embodiment of a block estimator module 305 of the present invention. The block estimator module 305 includes a logic module 405, a register module 410, and a communications module 415. As described above, the block estimator module 305 creates a data block size estimate of the size of a buffer data block 210 in the data buffer 125.

The communications module 415 communicates with the computer 105 and the data buffer 125 of the destination node 110. The logic module 405 queries the computer 105 and the data buffer 125 through the communications module 415. In one embodiment, the logic module 405 queries the data buffer 125 to determine the size of the largest buffer data block 210 in the data buffer 125. The logic module 405 may create a data block size estimate proportional to the size of the largest buffer data block 210.

In an alternate embodiment, the logic module 405 queries the computer 105 to determine the size of a memory data block 205. The logic module 405 may query the size of a memory data block 205 created by the same software application that wrote the buffer data block 210a to be recovered. In a certain embodiment, the logic module 405 may query the size of the largest memory data block 205 in the memory module 115 of the computer 105.

The register module 415 saves a data block size record. In one embodiment, the data block size record represents the largest data block size that the block estimator 305 has received from querying the computer 105 and the data buffer 125. The logic module 405 may compare the size of a queried data block to the value of the register module 415. If the size of the queried data block is larger, the logic module 405 may write the size of the data block to the register module 415. In an alternate embodiment, the block estimator 305 may set the data block size record to zero prior to creating a data block size estimate.

The block estimator 305 creates a data block size estimate of the size of the buffer data block 210. To create the data block size estimate, the block estimator 305 determines which is the largest of the queried buffer data blocks 210 or memory data blocks 205 and calculates an estimate proportional to the largest data block size. In one embodiment, the data block size estimate is equal to the size of the queried data block. In an alternate embodiment, the data block size estimate is greater than the size of the queried data block by a selected amount.

Figure 5:
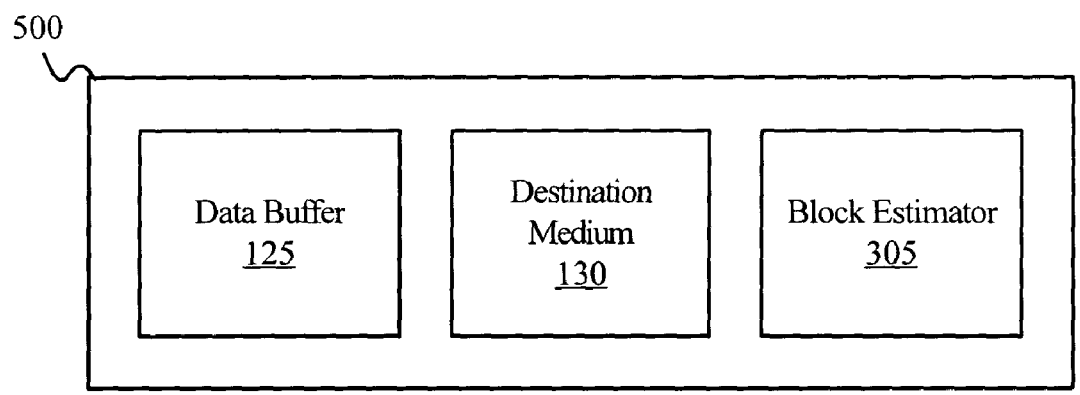
FIG. 5 is a block diagram illustrating a one embodiment of destination node of the present invention.

FIG. 5 is a block diagram illustrating a destination node 500 of the present invention. The destination node 500 includes a data buffer 125, a destination medium 130, and a block estimator 305. The destination node 500 creates a data block size estimate to report to a computer 105 that may recover a buffer data block 210 from the data buffer 125 of the destination node 500.

The destination node 500 receives a memory data block 205c into the data buffer 125. In one embodiment, the block estimator 305 creates and maintains a data block size estimate of the largest buffer data block 210b potentially residing in the data buffer 125. In an alternate embodiment, the block estimator 305 creates a data block size estimate in response to a request for a data block size estimate or in response to an error condition. The destination node 500 may respond with the data block size estimate to a request from the computer 105 attempting to recover the buffer data block 210a. The destination node 500 may include the data block size estimate when notifying the computer 105 of an error condition.

Figure 6:
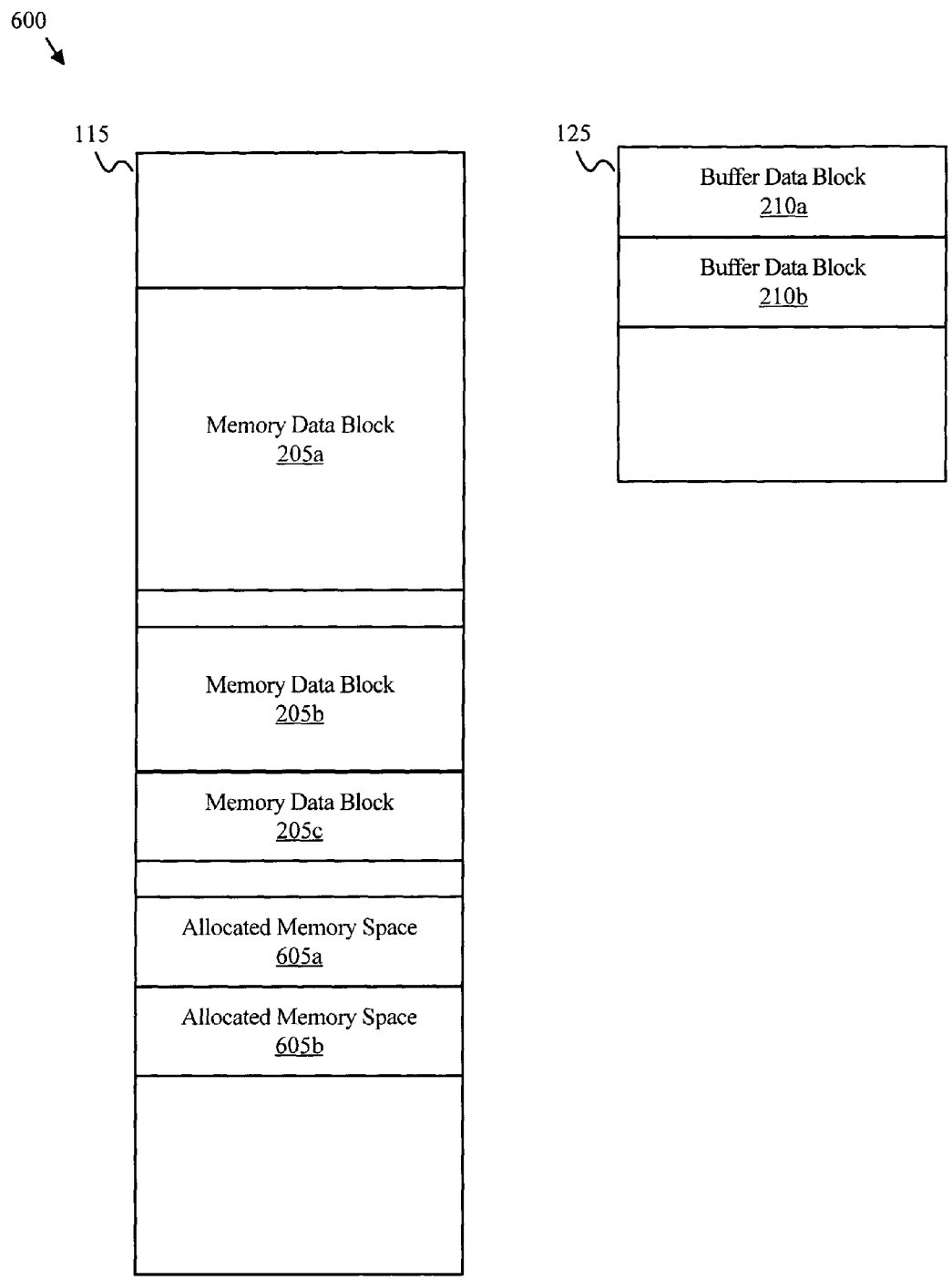
FIG. 6 is a block diagram illustrating one embodiment of a memory map of the present invention.

FIG. 6 is a block diagram illustrating one embodiment of a memory map 600 of the present invention. The memory map 600 includes a memory module 115, a data buffer 125, one or more memory data blocks 205, one or more buffer data blocks 210, and one or more allocated memory spaces 605. The memory map 600 illustrates the reservation of allocated memory space 605 proportional to the data block size estimate.

If an error condition occurs that prevents the data buffer 125 from copying the buffer data block 210a to the destination medium 130, the computer 105 must recover the buffer data block 210a or lose the buffer data block's 210a data. To recover the buffer data block 210a, the block estimator 305 estimates the size of the buffer data block 210a in the data buffer 125. The computer 105 reserves the allocated memory space 605a proportional to the data block size estimate to receive the buffer data block 210a. In one embodiment, the allocated memory space 605a is at least as large as the data block size estimate. In an alternate embodiment, the allocated memory space 605a is larger by a selected amount than the data block size estimate. The computer 105 recovers the buffer data block 210a to the allocated memory space 605a.

Reserving the allocated memory space 605a equivalent in size to the buffer data block 210a typically reduces the size of the allocated memory space 605a. The smaller allocated memory space 605a may allow the reservation of additional allocated memory space 605b to recover a second buffer data block 210b, reducing the risk that the computer 105 will stall or the data block recovery process will fail because of insufficient memory. The smaller allocated memory space 605a may also reduce the processing time required to reserve the allocated memory space 605a.

Figure 7:
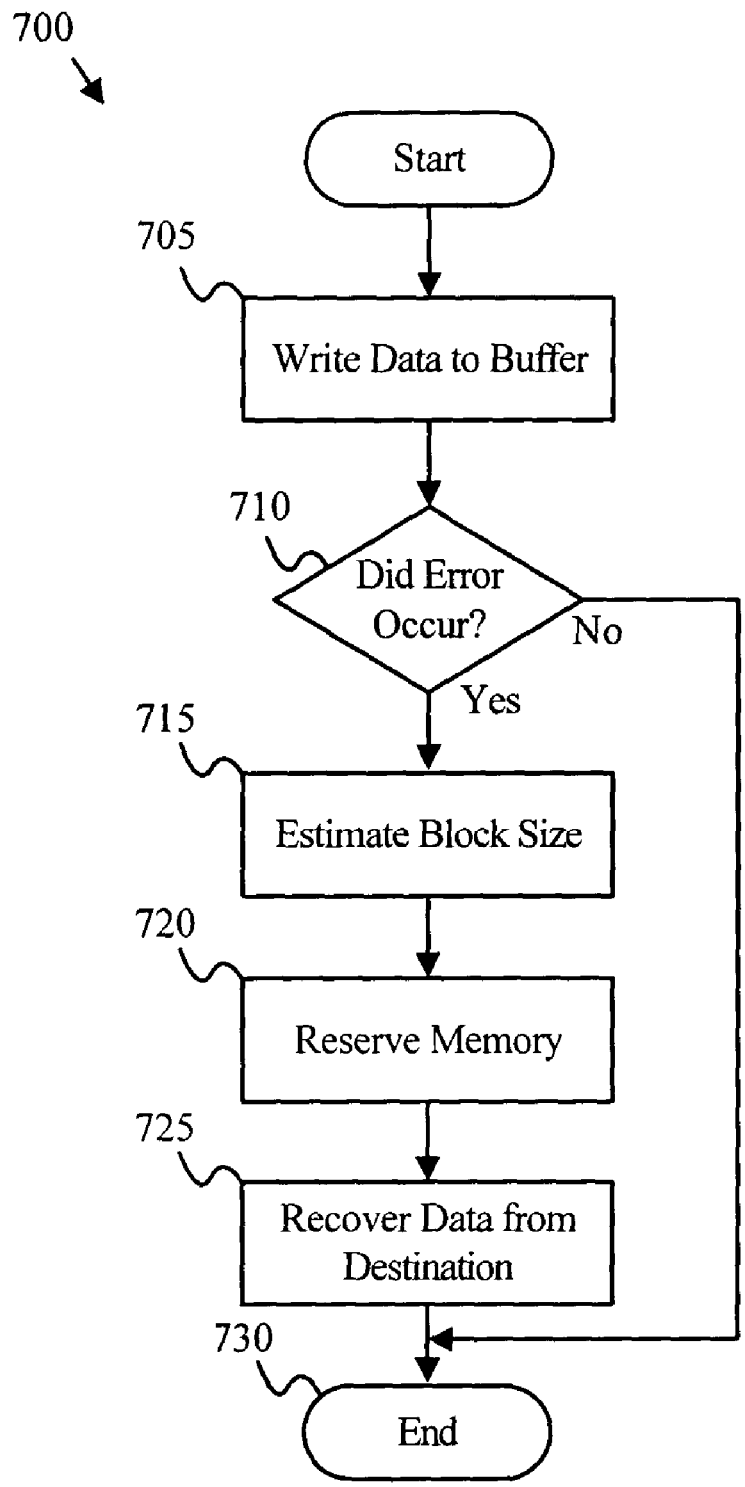
FIG. 7 is a flow chart diagram illustrating one embodiment of a data block recovery process of the present invention.

FIG. 7 is a flow chart diagram illustrating one embodiment of a data block recovery process 700 of the present invention. The data block recovery process 700 estimates the size of the buffer data block 210a to be recovered during a data block recovery process 700 and reserves the allocated memory space 605a proportional to the data block size estimate. Although for purposes of clarity the process 700 is depicted in a certain sequential order, execution may be conducted in parallel and not necessarily in the depicted order.

The computer 105 writes 705 the memory data block 205c to the buffer data block 210a of the data buffer 125. The process 700 determines 710 if an error condition occurred that prevented the destination node 110 from copying the buffer data block 210a to the destination medium 130. If no error condition occurred, the data block recovery process 700 ends 730.

If an error condition occurs indicating that the data buffer failed to write the buffer data block 210a to the destination medium 130, the data block recovery process 700 proceeds to estimate 715 the size of the buffer data block 210a. The data block recovery process 700 reserves 720 the allocated memory space 615 proportional to the data block size estimate, reducing the size of the memory space required for the data block recovery process 700. The computer 105 recovers 725 the buffer data block 210a to the allocated memory space 605a. The risk of the computer 105 stalling because excessive allocated memory space 605 is reserved for the data block recovery process is reduced. The processing time needed to reserve allocated memory space 605 may also be reduced, although the processing time required to generate a data block size estimate may be increased.

Figure 8:
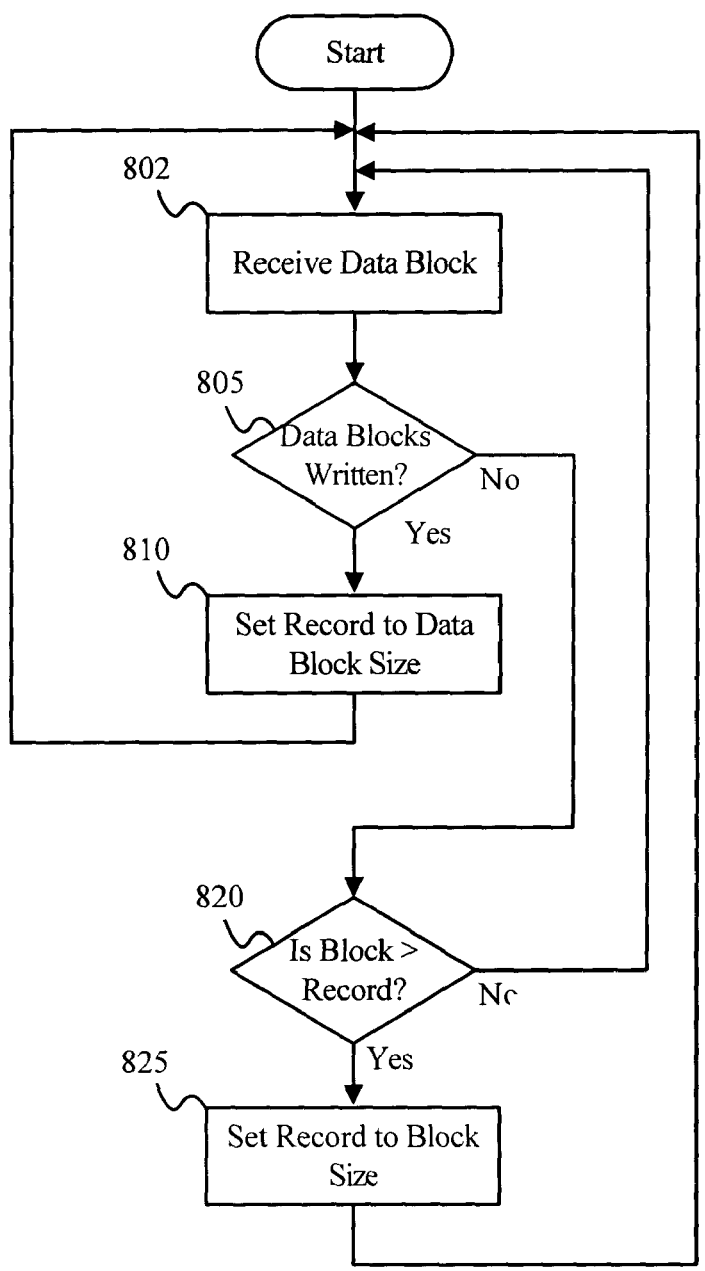
FIG. 8 is a flow chart diagram illustrating one embodiment of a data block size record generation process of the present invention.

FIG. 8 is a flow chart diagram illustrating one embodiment of a data block size record generation process 800 of the present invention. The data block size record generation process 800 generates a data block size record of the largest buffer data block 210 in the data buffer 125. The data block size record may be used for estimating 715 the data block size estimate during the data block recovery process 700. Although for purposes of clarity the process 800 is depicted in a certain sequential order, execution may be conducted in parallel and not necessarily in the depicted order.

The data buffer 125 receives 802 a memory data block 205. The block estimator 305 determines 805 if all previously received buffer data blocks 210 have been written from the data buffer 125. If the previous buffer data blocks 210 have not been written, the process 800 loops to determine 820 if the received memory data block 205 size is greater than the data block size record. If the previously received buffer data blocks 210 have been written, the block estimator 305 proceeds to set 810 the data block size record to the size of the received data block.

The block estimator 305 determines 820 if the memory data block 205 written to the data buffer 125 is larger than the data block size record. If the memory data block 205 is not larger than the data block size record, the process 800 loops to receive 802 a memory data block 205. If the memory data block 205 is larger than the data block size record, the process 800 proceeds to set 825 the data block size record to the size of the memory data block 205. The data block size record generation process 800 loops to receive 802 the memory data blocks 205.

The process 800 maintains a data block size record equal to the size of the largest possible buffer data block 210 in the data buffer 125. The data block size record provides a convenient data block size for creating the data block size estimate for the data buffer recovery process 700.

Figure 9:
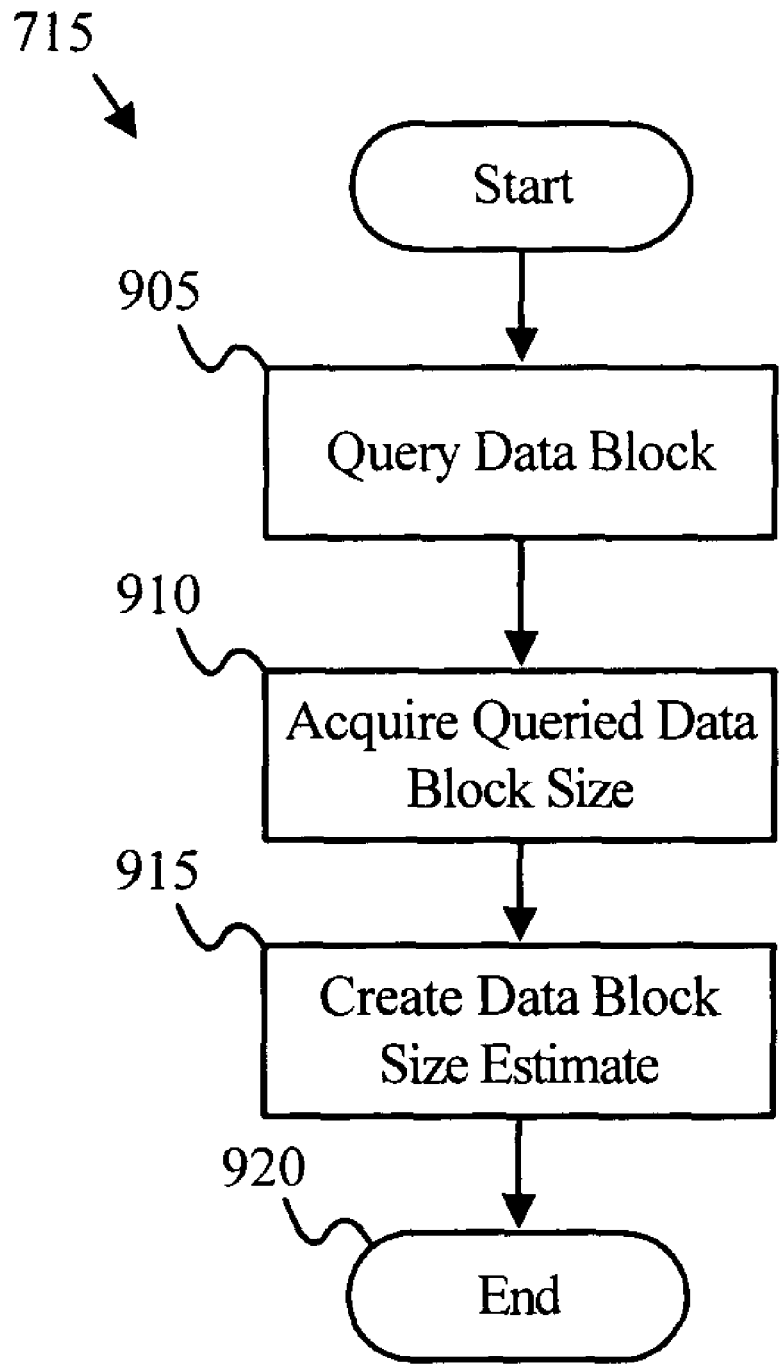
FIG. 9 is a flow chart diagram illustrating one embodiment of a data block estimation process of the present invention.

FIG. 9 is a flow chart diagram illustrating one embodiment of a data block estimation process 715 of FIG. 7 of the present invention. The data block size estimation process 715 creates a data block size estimate. Although for purposes of clarity the process 715 is depicted in a certain sequential order, execution may be conducted in parallel and not necessarily in the depicted order.

In one embodiment, the block estimator 305 queries 905 a buffer data block 210 in the data buffer 125. In an alternate embodiment, the block estimator 305 queries 905 a memory data block 205 in the memory module 115. The memory data block 205 may have been created by the same application program that created the buffer data block 210a. In a certain embodiment, the block estimator 305 queries 905 a memory data block 205 that is scheduled to be written to the destination node 110 that reported the error condition triggering the data block recovery process 700. In an alternate embodiment, the queried memory data block 205 is scheduled to be written to any destination node 110.

In one embodiment, the data block estimator process 715 acquires 910 the size of the queried memory data block 205. The data block estimation process 715 may select the first queried data block as the basis for a data block size estimate. Alternately, the data block estimation process 715 may select the largest queried data block 205 as basis for the data block size estimate.

The data block estimation process 715 creates 915 a data block size estimate proportional to the size of a queried data block. In one embodiment, the data block size estimate is equivalent to the size of the queried data block. In an alternate embodiment, the data block size estimate is larger than the size of the queried data block.

The data block estimation process 715 creates a data block size estimate proportional to the size of queried data block. The data block size estimate may be used by the data block recovery process 700 to recover a buffer data block 210 from a data buffer 125.

The present invention estimates the size of a buffer data block 210 in a data buffer 125. The data block size estimate may be used to reserve allocated memory space 605 for recovering the buffer data block 210 from the data buffer 125. The data block size estimate is typically smaller than an estimate based on the size of the data buffer 125, reducing the processing time and memory required to reserve a sufficiently large memory space to recover the data block.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for estimating a data block size, the apparatus comprising:
    a communications module configured to communicate with a data buffer and a computer;
    a register module configured to store a data block size record; and
    a logic module in communication with the communications module and the register module, the logic module configured to query the size of a data block, and set the data block size record equal to the greater of a queried data block size and a current data block size record, the logic module further configured to generate a data block size estimate proportional to the data block size record.

2. The apparatus of claim 1, wherein the logic module is also configured to query the data block size of a buffer data block in the data buffer.

3. The apparatus of claim 1, wherein the logic module is also configured to query the data block size of a memory data block in the computer.

4. The apparatus of claim 1, wherein the data block size estimate is equivalent to the data block size record.

5. The apparatus of claim 1, wherein the data block size estimate is greater than the data block size record.

6. An apparatus for generating a data block size estimate, the apparatus comprising:
    a data buffer configured to store a data block and a data block size record; and
    a block estimator module configured to set the data block size record equal to the greater of a data block size and a current data block size record, the block estimator module further configured to communicate a data block size estimate proportional to the data block size record.

7. The apparatus of claim 6, wherein the data block size estimate is equal to the data block size record.

8. The apparatus of claim 6, wherein the data block size estimate is greater than the data block size record.

9. An apparatus for allocating memory for recovering a data block, the apparatus comprising:
    means for storing a data block;
    means for querying the size of a data block disposed in the means for storing; and
    means for calculating a data block size estimate proportional to the size of the queried data block.

10. The apparatus of claim 9, wherein the means for calculating is further configured to calculate the data block size estimate as the size of the largest data block in the means for storing.

11. The apparatus of claim 9, wherein the means for calculating is further configured to calculate the data block size estimate as the size of the last data block written to the means for storing.

12. A system for allocating memory for recovering data, the system comprising:
    a data buffer configured to store a buffer data block;
    a memory module configured to recover the buffer data block; and
    a block estimator module configured to calculate a data block size estimate of a size of the buffer data block, the block estimator module further configured to reserve an allocated memory space in the memory module to receive the buffer data block.

13. The system of claim 12, wherein the data block size estimate is equal to the size of a data block queued to be written to the data buffer.

14. The system of claim 12, wherein the data block size estimate is equal to the size of the largest buffer data block in the data buffer.

15. The system of claim 12, wherein the data block size estimate is equal to the size of the largest memory data block in the memory module.

16. The system of claim 12, wherein the block estimator module is configured to reserve the allocated memory space with a size equal to the data block size estimate.

17. The system of claim 12, wherein the block estimator module is configured to reserve the allocated memory space with a size greater than the data block size estimate.

18. A process for estimating data block size, the method comprising:
    querying a size of a data block; and
    creating a data block size estimate proportional to the size of the data block.

19. The process of claim 18, wherein the data block is disposed in a memory module.

20. The process of claim 18, wherein the data block is disposed in a data buffer.

21. The process of claim 18, further comprising querying the size of a data block queued to be written to a destination node.

22. The process of claim 18, further comprising recording the size of the largest data block in the data buffer.

23. A computer readable storage medium comprising computer readable code configured to carry out a process of estimating the size of a data block, the process comprising:
    querying a size of a data block; and
    calculating a data block size estimate proportional to the size of the data block.

24. The computer readable storage medium of claim 23, wherein the data block is disposed in a data buffer.

25. The computer readable storage medium of claim 23, wherein the data block is disposed in a memory module.

26. The computer readable storage medium of claim 23, wherein the data block is queued to be written to the data buffer.

27. The computer readable storage medium of claim 23, wherein the data block size estimate is equal to the queried data block size.

28. The computer readable storage medium of claim 23, wherein comprising the data block size estimate is greater than the queried data block size.

* * * * *